(12) United States Patent
Fütterer

(10) Patent No.: US 6,223,437 B1
(45) Date of Patent: *May 1, 2001

(54) METHOD FOR FABRICATING A FRICTION BEARING, AND FRICTION BEARING

(75) Inventor: Bodo Fütterer, Luzern (CH)

(73) Assignee: Maxon Motor GmbH (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,420

(22) Filed: Sep. 3, 1998

(30) Foreign Application Priority Data

Sep. 5, 1997 (DE) .............................................. 197 38 919

(51) Int. Cl.$^7$ .................................................. B21D 53/10
(52) U.S. Cl. ................. 29/898.14; 384/902; 29/898.054
(58) Field of Search ........................ 29/898.054, 898.14; 384/279, 902, 910

(56) References Cited

U.S. PATENT DOCUMENTS

| | | | |
|---|---|---|---|
| 2,096,252 | * 10/1937 | Koehring | 75/22 |
| 2,241,789 | * 5/1941 | Queneau et al. | 19/149.5 |
| 2,329,483 | * 9/1943 | Queneau et al. | 308/237 |
| 2,372,202 | * 3/1945 | Hensel et al. | 308/242 |
| 2,372,203 | * 3/1945 | Hensel et al. | 75/22 |
| 2,763,519 | * 9/1956 | Thomson | 308/240 |
| 2,894,792 | * 7/1959 | Brilli | 308/240 |
| 3,118,272 | * 1/1964 | Clapp | 57/120 |
| 3,232,754 | 2/1966 | Storcheim | |
| 3,883,314 | * 5/1975 | Schnyder et al. | 29/182.5 |
| 3,984,158 | * 10/1976 | Sorensen et al. | 308/8.2 |
| 4,608,085 | * 8/1986 | Eudier et al. | 75/247 |
| 5,120,091 | * 6/1992 | Nakagawa | 384/279 |
| 5,704,718 | * 1/1998 | Mori et al. | 384/279 |

FOREIGN PATENT DOCUMENTS

| | | | |
|---|---|---|---|
| 977 469 | 7/1966 | (DE) . | |
| 4001899C1 | 7/1991 | (DE) . | |
| 4225398 | * 2/1994 | (DE) | F16C/33/14 |
| 19521941C1 | 10/1996 | (DE) . | |
| 19524510A1 | 1/1997 | (DE) . | |
| 3822919 C2 | 6/1997 | (DE) . | |
| 049 373 | 4/1982 | (EP) . | |
| 0 428 539 | 7/1989 | (EP) . | |
| 2050429 | * 1/1981 | (GB) | B22F/3/00 |
| 2220420 | 1/1990 | (GB) . | |
| 57-16147 | 1/1982 | (JP) . | |
| 62-13818 | 1/1987 | (JP) . | |
| 62-180110 | 8/1987 | (JP) . | |
| 363176819 | * 7/1988 | (JP) | F16C/33/10 |
| 363176820 | * 7/1988 | (JP) | F16C/33/12 |
| 3-505908 | 12/1991 | (JP) . | |
| 6-341438 | 12/1994 | (JP) . | |
| 196768 | 8/1996 | (JP) . | |
| 409112560 | * 5/1997 | (JP) | F16C/33/10 |
| 411236604 | * 8/1999 | (JP) | B22F/3/24 |

OTHER PUBLICATIONS

German article from "Workshop and Factory" dated May 1949.

* cited by examiner

Primary Examiner—S. Thomas Hughes
Assistant Examiner—Essama Omgba
(74) Attorney, Agent, or Firm—Tilton, Fallon, Lungmus & Chestnut

(57) ABSTRACT

Methods for fabricating a friction bearing, in particular for ceramic shafts, made of metallic hardenable sintered material having an open pore volume of at least 15%, wherein the sintered material is brought into a predetermined shape and is subsequently sintered. For improving the known friction bearings in that a local wear and tear of shaft and bearing is avoided or at least considerably reduced in the region of mixed friction with high lateral forces, it is provided to harden the friction bearing after the sintering.

5 Claims, 1 Drawing Sheet

METHOD FOR FABRICATING A FRICTION BEARING, AND FRICTION BEARING

FIELD OF THE INVENTION

The invention relates to a method for fabricating a friction bearing, in particular for ceramic shafts, made of metallic hardenable sintered material having an open pore volume of at least 15%, wherein the sintered material is brought into a predetermined shape and is subsequently sintered.

BACKGROUND OF THE INVENTION

Methods for fabricating friction bearings of the above-mentioned kind are known from industrial practice. The friction bearing is thereby made of sintered bronze or sintered iron, respectively, and the pore volume of this sintered bearing is maximally 30%. Such a pore volume is necessary for assuring good lubricating properties of the bearing with sufficient consistency. In general, the porous bearing is infiltrated with oil under negative pressure or vacuum, respectively, with the result that the oil settles in the interconnected pore volume. In order to allow the lubricant to also settle in the interior area of the porous bearing, open pores are required.

In the first place, the disadvantage of said known friction bearings consists in a bad running performance at low circumferential speeds of the shaft and/or with large lateral forces exerted on the shaft.

If the circumferential speed of the shaft drops below a certain value with a constant lateral force, or if the lateral force exerted on the shaft exceeds a certain value at a constant circumferential speed, insufficient pressure is built up in the gap of the bearing between shaft and bearing to effect a hydrodynamic lubrication process where the shaft floats on a lubricating film.

At sufficiently high circumferential speeds or sufficiently low lateral forces, the shaft floats on said lubricant and the bearing friction is solely determined by the friction of the fluid.

At low circumferential speeds, a mixed friction prevails between the shaft and the bearing, where, besides the fluid friction, there is also direct contact between the shaft and the bearing. This range of mixed friction involves an increase in wear and tear and an increased development of heat due to the increased friction in the bearing.

Through a high lateral force exerted on the shaft, as occurs in particular with engine drives, the region of mixed friction is shifted towards higher running speeds; a direct contact between the shaft and the bearing already occurs at high speeds.

The above-mentioned friction bearing technology common in industrial practice has the disadvantage that it fails in the region of mixed friction, where the heat development caused by the large amount of dry friction is so high and where such high local temperatures in the bearing occur, that the lubricant decomposes and the porous bearing is subject to wear and tear. The shaft seizes the bearing.

It is, therefore, known from the EP 0 428 539 B1 to substitute the sintered bronze bearing with a metal-ceramics sinter mixture as, on one hand, the combination of material ceramics-ceramics for bearings and shafts has very low sliding friction coefficients and a high temperature resistance in the region of mixed friction and on the other hand, the metal has a good thermal conductivity.

It turned out, however, that with high lateral forces being exerted on a bearing made of a metal-ceramics sinter mixture and a ceramic shaft, a local decomposition of the oil occured in the area of mixed friction due to coking.

For this reason, ball bearings have so far been exclusively used in the region of mixed friction or with non-stationarily driven shafts. In small-sized electric motors and the drive shafts thereof, however, the construction size and the prices of the available small-sized ball bearings are in the range of those of an electric motor.

SUMMARY OF THE INVENTION

It is, therefore, the object of the invention to improve the known friction bearings by avoiding, or at least considerably reducing, a local wear and tear of the shaft and the bearing in the region of mixed friction with high lateral forces.

According to the invention this object is achieved by hardening the friction bearing after the sintering.

The solution according to the invention has the surprising advantage that hardened porous bearings with a minimum pore volume of 15%, especially in correlation with ceramic shafts, are practically not subject to wear and tear in the region of mixed friction. The inventive friction bearings can, thus, be used over a wide range of speed and with high lateral forces up to the region of mixed friction. The temperature of the bearing even remains low enough in the area of mixed friction such that a decomposition of the lubricant does not take place. Also a local sparking in case of direct contact, which results in a partial combustion of bearing material and lubricant, as is known of ceramic bearings, no longer occurs with the bearings, according to the invention.

Although the hardness of the inventive bearings is reduced as compared to ceramic bearings, practically no wear and tear occurs with the inventive hardened bearings in the region of mixed friction despite the, in contrast to the known bearings, smaller difference in hardness to the shaft.

In a particularly advantageous embodiment, the friction bearing can be tempered after the hardening to reduce the brittleness of the friction bearing.

In an advantageous embodiment of the invention, the sintered material can be sintered steel. Sintered steel is especially low in price and can easily be heat-treated, i.e. hardened and tempered. With sintered steel, surface treatments such as nitriding, boronizing, carbonizing, case hardening and boundary layer hardening can also be performed.

In a further embodiment, the sintered material can also be a hardenable bronze, for example, an aluminium nickel alloy. As is known, bronze is low in price and has a sufficient surface hardness and rigidity.

It can, moreover, be that the sintered material is a hardenable nickel alloy. Nickel alloys have a particularly high rigidity, stability and thermal resistance.

In observation of the dimensional tolerances of the friction bearing, it is advantageous if the running surface of the friction bearing can be calibrated after the sintering. As the sintered material can be easily calibrated after the sintering and prior to the hardening it is, moreover, advantageous if the running surface can be calibrated prior to the hardening. It can, however, also be that the running surface is calibrated after the hardening. By means of the calibration after the hardening, the dimensional accuracy of the friction bearing is increased, as, in this way, the structural changes from the thermal treatment can no longer influence the dimensions of the friction bearing.

The invention relates further to a friction bearing, in particular for ceramic shafts, made of hardenable metallic sintered material having an open pore volume of at least 15%.

In view of the friction bearing, the object of the invention is achieved in that the friction bearing is hardened.

A shaft-bearing combination subject to particularly low wear and tear in the area of mixed friction is obtained, if the friction bearing system is constructed such that ,besides the inventive bearing, the shaft is equally made of sintered material.

Equally, very good wear and tear values were obtained if, in a further embodiment, the shaft was made of hard metal. In a further embodiment, zirconium oxide could also be used as material. Hard metal or zirconium oxide, respectively, have a high degree of hardness with the result that the shaft has a higher surface hardness than the bearing. In the interest of prevention from wear and tear, a harder shaft has shown to be the best solution in friction bearing technology.

BRIEF DESCRIPTION OF THE DRAWINGS

In the following, the invention is explained by using the attached illustrations.

DETAILED DESCRIPTION OF THE PREFERRED EMBODIMENT

The structure of the invention is explained in the following: For fabricating the exemplarily described bearing, sintered steel powder, having a grain size of about 150 $\mu$m, is pressed into a mould corresponding to the friction bearing. The shaping can thereby take place through cold pressing, hot pressing and through simple pouring, through pressure sintering and through explosive compaction. By adding further metal powders, such as nickel, an increased thermal resistance can be obtained with exactly reproducible mixing ratios.

The sintering process essentially takes place in the same way as with common sintered bearings made of bronze.

Subsequently, the bearing bore of the bearing removed from the mould is calibrated, just as with conventional porous bearings, by drawing a corresponding calibration mandrel through the bearing bore.

The bearing is, thereafter, hardened and tempered. With highly loaded bearings, an additional surface treatment may now take place, such as nitriding, carbonizing, carbonnitriding, case hardening and boundary layer hardening.

The bearing is now infiltrated with oil under a vacuum, such that oil is stored in the pores of the bearing.

To allow the bearing to take up sufficient lubricant, attention must be paid during the shaping and the sintering so that the friction bearing material is not compressed too much. In practice, an open pore volume of 20% has proved to be optimum. This value guarantees the circulation of the lubricant during the operation of the bearing without the occurrence of significant losses in stability of the bearing.

Such a method is particularly suited for fabricating friction bearings for small-sized electric motors with shaft and bearing inner diameters of smaller than 5 mm, often smaller than 1 mm.

Figure 1:
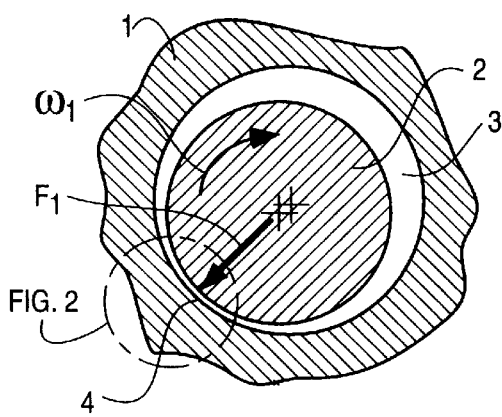
FIG. 1 shows a shaft and a friction bearing in cross-section at high speed during the hydrodynamic lubrication under the influence of lateral forces.

FIG. 1 shows a bearing 1 in which a shaft 2 is arranged so as to form a bearing gap 3, filled with lubricant between the bearing 1 and the shaft 2. The shaft rotates at an angular speed $\omega_1$ Moreover, force $F_1$ acts on the shaft. Through the rotational movement of the shaft, lubricant is pumped between bearing 1 and shaft 2 in the bearing gap 3 at one location thereof Said location lies in the direction of application of force of force $F_1$, such that the bearing 1 and the shaft 2 are separated by a lubricating film. In this state, the bearing runs practically wear-free and has a small friction coefficient as pure fluid friction prevails.

Figure 2:
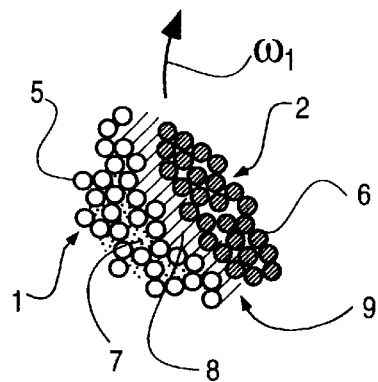
FIG. 2 shows a schematic detailed view of the sintered structure of shaft and friction bearing in cross-section during the hydrodynamic supporting process of FIG. 1.

FIG. 2 shows the detail X from FIG. 1, wherein the originally ball-shaped sintered grains 5, 6 of the bearing and the shaft combined with each other through the sintering process are illustrated. The hollow spaces 7 of the sintered structure 5 of the bearing 1 are infiltrated with lubricant. In the hydrodynamic lubrication state, a lubricating film 8 forms between the bearing 2 and the shaft 1. Said film is pumped into the gap through the rotational movement $\omega_1$ of the shaft 2 in direction of the arrow 9, such that the sintered structures 5, 6 of bearing 1 and shaft 2 are nowhere in contact with each other.

Figure 3:
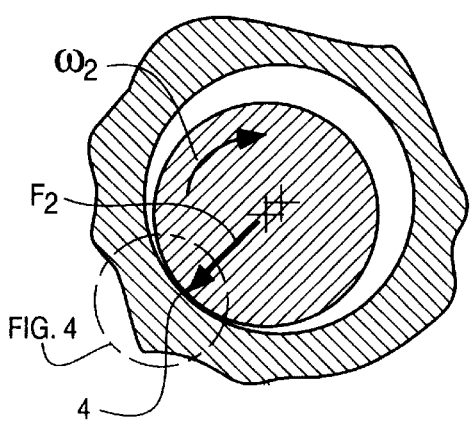
FIG. 3 shows a shaft and a friction bearing in cross-section at low speed with mixed friction under the influence of lateral forces.

FIG. 3 shows the bearing from FIG. 1 in the area of mixed friction. In contrast to FIG. 1, the speed is reduced to $\omega_2<\omega_1$ and/or the lateral force is increased to $F_2>F_1$, so that the pressure in the lubricant built up through the rotational movement $\omega_2$ of the shaft 2 is no longer sufficient at spot 4 for fully pumping lubricant between shaft 2 and bearing 1.

Figure 4:
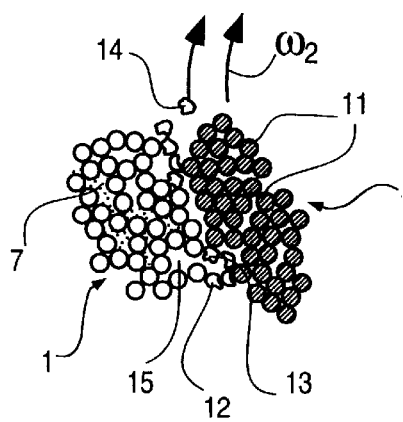
FIG. 4 shows a schematic detailed view of the sintered structure of shaft and friction bearing of a known ceramics-ceramics material combination in cross-section.

FIG. 4 shows a detail $Y_1$ of the sintered structure of bearing 1 and shaft 2 of the known material combination ceramics-ceramics in the region of mixed friction at a location of high local temperature which is generated, in that, at location 11, the structures of bearing 1 and shaft 2 slide, with friction, against each other directly without a lubricating film therebetween. Through this sliding and the partial collision of sintered grains, the sintered grains 12 are deformed right at the contact point, or break, especially in the case of brittle ceramic particles, 13, and are taken along in the bearing gap, 14, resulting in further abrasion. Even though the increased temperature in the area of mixed friction reduces the viscosity of the lubricant so that the lubricant can be more easily transported into the bearing gap, a decomposition, coking, or even evaporization of the lubricant may occur at very high temperatures in areas 15, which are adjacent to the contact points 11 (higher than about 100° C.).

Figure 5:
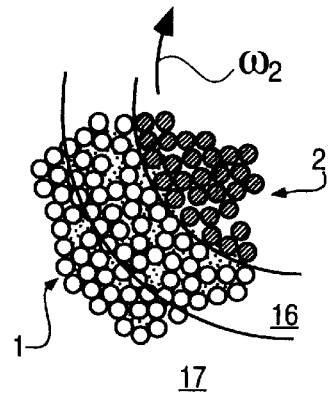
FIG. 5 shows a schematic detailed view of the sintered structure of shaft and friction bearing of an inventive material combination in cross-section.

FIG. 5 shows the friction bearing, according to the invention, having a sintered bearing 1 of hardened sintered steel and a sintered ceramic shaft of zirconium oxide. The hardening thereby has an effect only down to a restricted depths 16 of bearing 1. Sintered material 17 lying underneath is not hardened and, thus, forms a soft structure. The open pore volume is 20% and the pores are filled with lubricant.

In the following, the functionality of the invention in the region of mixed friction is explained:

Through the higher thermal conductivity of pure metal in contrast to metal-ceramics combinations, the heat is rapidly transported away from the contact points, such that the effects described above in FIG. 4 occur only at much lower speeds or much higher lateral forces in contrast to the known material combinations.

As the shaft material with about 2000 to 2500 HV 30 is harder than the hardened bearing running surface with 600 to 700 HV 2, the running surface takes up the main deformation during the mixed friction without brittle zirconium particles breaking free. Thus, the bearing system according to the invention is less subject to wear and tear in the area of mixed friction than known bearings.

I claim:

1. A method for fabricating a friction bearing for small-sized electric motors with ceramic shafts, comprising the steps of:

bringing a hardenable sinter metal into a predetermined shape with an inner diameter of less than 5 mm;

subsequently sintering the shaped sinter metal until an open pore volume of at least 15% is reached to form a friction bearing;

hardening the sintered friction bearing;

calibrating a running surface of the friction bearing after said hardening;

subsequently filling the pores of the friction bearing with oil under a vacuum; and combining the friction bearing with a ceramic shaft.

2. The method according to claim 1, and wherein said friction bearing is tempered after the hardening.

3. The method according to claim 1 or 2, wherein said sintered material is a sintered steel.

4. The method according to claim 1 or 2, wherein said sintered material is made of bronze.

5. The method according to claim 1 or 2, wherein said sintered material a nickel alloy.

* * * * *